(12) United States Patent
Abe et al.

(10) Patent No.: US 12,159,743 B2
(45) Date of Patent: Dec. 3, 2024

(54) ALLOY RIBBON AND MAGNETIC CORE

(71) Applicant: TDK CORPORATION, Tokyo (JP)

(72) Inventors: Kyotaro Abe, Tokyo (JP); Takuya Tsukahara, Tokyo (JP); Isao Nakahata, Tokyo (JP); Kazuhiro Yoshidome, Tokyo (JP)

(73) Assignee: TDK CORPORATION, Tokyo (JP)

( * ) Notice: Subject to any disclaimer, the term of this patent is extended or adjusted under 35 U.S.C. 154(b) by 112 days.

(21) Appl. No.: 17/209,422

(22) Filed: Mar. 23, 2021

(65) Prior Publication Data
US 2021/0304936 A1    Sep. 30, 2021

(30) Foreign Application Priority Data

Mar. 24, 2020 (JP) ................. 2020-052775

(51) Int. Cl.
| | |
|---|---|
| *H01F 3/04* | (2006.01) |
| *B22D 11/00* | (2006.01) |
| *C21D 6/00* | (2006.01) |
| *C21D 9/56* | (2006.01) |
| *C22C 1/11* | (2023.01) |
| *C22C 19/07* | (2006.01) |
| *C22C 38/02* | (2006.01) |
| *C22C 45/02* | (2006.01) |
| *H01F 1/147* | (2006.01) |

(Continued)

(52) U.S. Cl.
CPC .............. *H01F 3/04* (2013.01); *B22D 11/001* (2013.01); *C21D 6/008* (2013.01); *C21D 9/563* (2013.01); *C22C 1/11* (2023.01); *C22C 19/07* (2013.01); *C22C 38/02* (2013.01); *C22C 45/02* (2013.01); *H01F 1/14775* (2013.01); *H01F 1/15316* (2013.01); *H01F 1/15333* (2013.01); *H01F 1/15341* (2013.01); *H01F 1/15383* (2013.01); *B82Y 25/00* (2013.01); *B82Y 30/00* (2013.01); *B82Y 35/00* (2013.01); *B82Y 40/00* (2013.01); *C21D 2201/03* (2013.01)

(58) Field of Classification Search
CPC ........... C08J 7/12; C08K 9/04; D06M 15/693; B23K 35/3601; B23K 35/0244; B23K 35/262; B23K 35/025
See application file for complete search history.

(56) References Cited

U.S. PATENT DOCUMENTS

| | | | | |
|---|---|---|---|---|
| 5,665,177 A | * | 9/1997 | Fukuno ................. | H01F 1/0571 164/463 |
| 2011/0206939 A1 | * | 8/2011 | Imai ...................... | F16C 33/121 428/553 |

(Continued)

FOREIGN PATENT DOCUMENTS

| | | | | |
|---|---|---|---|---|
| EP | 795693 A2 | * | 9/1997 | ............... B22F 7/04 |
| JP | 5885118 B2 | | 3/2016 | |

(Continued)

*Primary Examiner* — Jie Yang
(74) *Attorney, Agent, or Firm* — Oliff PLC

(57) ABSTRACT

The object of the present invention is to provide an alloy ribbon capable of having excellent adhesiveness between the alloy ribbons when a plurality of the alloy ribbons is stacked; and also, to provide a magnetic core using the alloy ribbon. The present invention is an alloy ribbon comprising metals scattered on at least one surface of the alloy ribbon, in which diameters of the scattered metals are 1 μm or more, and the scattered metals include Cu.

5 Claims, 3 Drawing Sheets

(51) Int. Cl.
*H01F 1/153* (2006.01)
*B82Y 25/00* (2011.01)
*B82Y 30/00* (2011.01)
*B82Y 35/00* (2011.01)
*B82Y 40/00* (2011.01)

(56) References Cited

U.S. PATENT DOCUMENTS

| | | | |
|---|---|---|---|
| 2013/0263973 A1* | 10/2013 | Kurahashi | C22C 19/058 |
| | | | 148/403 |
| 2014/0191832 A1 | 7/2014 | Ohta et al. | |
| 2019/0218646 A1* | 7/2019 | Toda | C22C 9/00 |
| 2020/0362442 A1 | 11/2020 | Hasegawa et al. | |

FOREIGN PATENT DOCUMENTS

| | | |
|---|---|---|
| WO | 2013-051380 A1 | 4/2013 |
| WO | 2019-138730 A1 | 7/2019 |

\* cited by examiner

ALLOY RIBBON AND MAGNETIC CORE

TECHNICAL FIELD

The present invention relates to an alloy ribbon and a magnetic core.

BACKGROUND

In recent years, as a material of a magnetic core of a magnetic device used for a power circuit, a Fe-based amorphous alloy, a Fe-based nanocrystal alloy, and the like are used from the point of improving a saturation magnetic flux density and from the point of decreasing a core loss.

For example, the Fe-based nanocrystal alloy is usually produced by quenching a liquid phase or a vapor phase including raw materials of Fe-based nanocrystal alloy to form an amorphous alloy, and then this amorphous alloy is heat treated to form a fine crystal. Specifically, for example, an alloy ribbon is produced by a super quenching method such as a single roll method and the like. However, the Fe-based nanocrystal alloy produced as an alloy ribbon is harder than a usual crystal alloy, and had a poor surface followability and also had a poor adhesiveness even when the alloy ribbons were stacked and pressured.

Patent Document 1 discloses a method of coating a resin to a surface of an alloy ribbon and drying the resin, then stacking the alloy ribbon. However, this method requires many procedures in each step, hence it was complicated to produce the alloy ribbon using this method.

By roughening the surface of the alloy ribbon, it is known that an adhesiveness between alloy ribbons improve due to an anchor effect. However, by roughening the surface of the alloy ribbon, a space factor of the alloy ribbon decreases, and magnetic properties deteriorated.

[Patent Document 1] JP Patent No. 5885118

SUMMARY

The present invention was achieved in view of such circumstances, and the object is to provide an alloy ribbon capable of exhibiting adhesiveness between alloy ribbons when a plurality of alloy ribbons at least one of which is made of the alloy ribbon according to the present invention are stacked; and also, the object of the present invention is to provide a magnetic core using the alloy ribbon.

The gist of the present invention is as described in below.
(1) An alloy ribbon having metals scattered on at least one surface of the alloy ribbon, in which
diameters of the scattered metals are 1 μm or more, and the scattered metals include Cu.
(2) The alloy ribbon according to (1), wherein the alloy ribbon has a Vickers hardness of 900 Hv or more.
(3) The alloy ribbon according to (1) or (2), wherein the scattered metals further include at least one selected from Zr, Cr, and Be.
(4) The alloy ribbon according to any one of (1) to (3), wherein the surface having the scattered metals has a surface roughness Ra of 1.0 μm or less.
(5) The alloy ribbon according to any one of (1) to (4) having the scattered metals in a frequency of 1 to 4,500 metal/mm$^2$.
(6) The alloy ribbon according any one of (1) to (4) having the scattered metals in a frequency of 10 to 1,000 metal/mm$^2$.
(7) A magnetic core formed by stacking alloy ribbons at least one of which is made of the alloy ribbon according to any one of (1) to (6).

DETAILED DESCRIPTION

Figure 1:
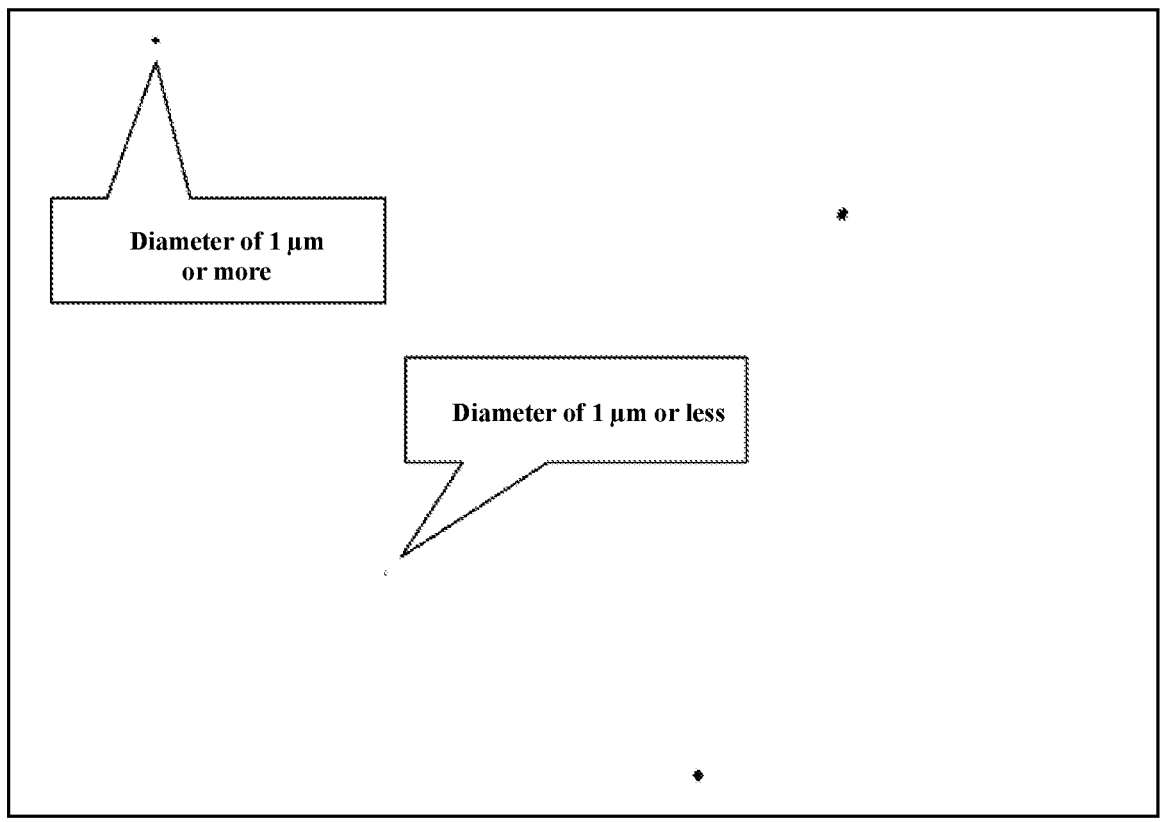
FIG. 1 is one example of an image obtained from a measurement by Energy Dispersive X-ray Spectroscopy (EDS).

The present invention is described based on following embodiment; however various modifications may be performed within the scope of the present invention.

An alloy ribbon according to the present embodiment includes an alloy ribbon body and scattered metals. Further, the alloy ribbon according to the present embodiment includes the scattered metals to at least one surface of the alloy ribbon. As an example, when the alloy ribbon is produced by a single roll method described in below, the alloy ribbon preferably has the scattered metals on a releasing face of the alloy ribbon which is facing against a roll. The alloy ribbon may have the scattered metals on one surface or may have on both surfaces.

In the alloy ribbon according to the present embodiment, sizes of the scattered metals are diameters of 1 μm or more. The sizes of the scattered metals are preferably 3 to 60 μm, and more preferably 5 to 20 μm. By having the sizes of the scattered metals within the above-mentioned range, the adhesiveness between the alloy ribbons can be improved while maintaining magnetic properties of the alloy ribbon. Also, regarding the magnetic core formed by stacking a plurality of alloy ribbons, a coercive force can be suppressed from increasing. By suppressing the increase of the coercive force of the magnetic core, a loss in AC magnetic field can be suppressed under the use of high frequency band. As a result, the magnetic properties under high frequency band can be improved.

The sizes of the scattered metals are Heywood diameter calculated based on Cu detection image of Energy Dispersive X-ray Spectroscopy (EDS). That is, regarding particles shown in the detection image, diameters of the circles having same areas as the projected areas of the particles are defined as diameters of the scattered metals.

In the alloy ribbon according to the present embodiment, the scattered metals include Cu. The scattered metals are preferably Cu or an alloy including Cu. A metal including Cu is softer than the alloy ribbon itself. As the alloy ribbon includes a soft material, that is as the scattered metals include Cu, an adhesiveness between the alloy ribbons can be improved. Also, regarding the magnetic core formed by stacking plurality of alloy ribbons at least one of which is made of the alloy ribbon, a coercive force is prevented from increasing.

In the alloy ribbon according to the present embodiment, the scattered metals may further include at least one selected from Zr, Cr, and Be. That is, as the scattered metals, the alloy including Cu may further include the above-mentioned elements. For example, Cu—Zr based alloy, Cu—Zr—Cr based alloy, Be—Cu based alloy, and the like may be mentioned.

By using the alloy including the above-mentioned elements as the scattered metals, an adhesiveness between the alloy ribbons can be improved. Note that, the elements of the scattered metals can be identified by Energy Dispersive X-ray Spectroscopy (EDS).

The alloy ribbon according to the present embodiment has a Vickers hardness of preferably 900 Hv or more, more preferably 1000 Hv or more, and further preferably of 1050 Hv or more. Also, a Vickers hardness of the alloy ribbon is preferably 1200 Hv or less, more preferably 1150 Hv or less, and further preferably 1100 Hv or less. Note that, the above-mentioned Vickers hardness represents a hardness of the alloy ribbon body. When a Vickers hardness of the alloy ribbon body is high, usually an adhesiveness between the alloy ribbons decreases. However, the alloy ribbon according to the present embodiment includes the scattered metals as mentioned in above, hence an adhesiveness between the alloy ribbons can be improved. On the other hand, when a Vickers hardness is too high, a desired adhesiveness may not be obtained even with the scattered metals on the alloy ribbon.

A Vickers hardness (Hv) is determined by a micro-Vickers hardness test. A diamond pyramid indenter with a facing angle of 136° was pressed into the alloy ribbon to measure a size of indentation formed by pressing, then a Vickers hardness is calculated. The indentation can be observed using CCD camera. In the present embodiment, five or more measurements are performed and an average thereof is taken. A Vickers hardness (Hv) is a value obtained by dividing a load F [N] with an indentation surface area S [m$^2$], and it is obtained by below formula based on a diagonal length d [m] of the indentation being measured.

Vickers hardness $(Hv)=F/S=1.854 \times F/d^2$

In the alloy ribbon according to the present embodiment, the surface roughness Ra of the surface where the metals are scattered is preferably 1.0 μm or less, more preferably 0.8 μm or less, and more preferably 0.6 μm or less. When the surface roughness Ra of the alloy ribbon is small, usually an adhesiveness between the alloy ribbons decreases. However, the alloy ribbon according to the present embodiment has an improved adhesiveness between the alloy ribbons because of the scattered metals as mentioned in above.

Note that, when the alloy ribbon is produced by a method using a roll such as a single roll method and the like which is discussed below, a surface roughness Ra of a releasing surface (a surface to which a surface of the roll is contacting) and a surface roughness Ra of a free surface (a surface which is not in contact with the surface of the roll) are different in the alloy ribbon.

In the alloy ribbon according to the present embodiment, the surface roughness Ra of the releasing surface is preferably about the same as the surface roughness Ra of the surface having the scattered metals. The surface roughness Ra of the free surface is not particularly limited, and usually it may be 0.1 to 4.3 μm.

A method of measuring the surface roughness Ra is based on JIS-B0601. Specifically, a measuring length is 4.0 mm, a cutoff wavelength is 0.8 mm, and cutoff type is 2RC (uncompensated phase).

The alloy ribbon according to the present embodiment has the scattered metals in a frequency preferably of 1 to 4500 metals/mm$^2$. The frequency of the scattered metals is more preferably 10 to 2700 metals/mm$^2$, further preferably 10 to 1000 metals/mm$^2$, and particularly preferably 200 to 1000 metals/mm$^2$. By having the scattered metals in a frequency as mentioned in above, an adhesiveness between the alloy ribbons can be improved while maintaining the magnetic properties of the alloy ribbon. Particularly, in the magnetic core formed by stacking plurality of alloy ribbons at least one of which is made of the alloy ribbon, the coercive force can be suppressed from increasing.

The scattered metals are detected by Energy Dispersive X-ray Spectroscopy (EDS), and a frequency of the scattered metals is calculated from number of metals detected. Specifically, on the surface of the alloy ribbon, the detected number of metals in an area of 317 μm×237 μm are counted. This procedure is repeated to nine places, and an average of these is defined as the frequency of the scattered metals. FIG. 1 is one example of the image obtained by EDS measurement. In reality, black and white shown in the image are actually reversed. FIG. 1 shows the metals scatted in an area of 317 μm×237 μm at the surface of the alloy ribbon.

When the alloy ribbon is produced by a method using a roll such as a single roll method as described in below, the frequency of the scattered metals can be controlled by regulating a temperature of releasing gas.

A size of the alloy ribbon according to the present embodiment is not particularly limited. For example, a thickness may be 15 to 30 μm, and a width may be 100 to 1000 mm.

(Composition of Alloy Ribbon)

In the alloy ribbon according to the present embodiment, as a material of the alloy ribbon body, any known material can be used, and for example, an amorphous alloy, a fine crystal alloy, a magnetic alloy such as permalloy, and the like can be used. As the alloy ribbon body made of the amorphous alloy material, for example, those made of Fe-based amorphous soft magnetic material, Co-based amorphous soft magnetic material, and the like may be mentioned. Also, as the alloy ribbon body made of a fine crystal alloy material, for example those made of Fe-based nanocrystal soft magnetic material may be mentioned. Specifically, as the Fe-based amorphous soft magnetic material, Fe—Si—B—Nb—Cu based alloy and the like may be mentioned, and as the Co-based amorphous soft magnetic material, Co—Fe—Si—B based alloy, and the like may be mentioned.

Here, the Fe-based nanocrystal has a particle size of nano order, and a crystal structure of Fe is bcc (body center cubic structure). When the structure includes Fe-based nanocrystal, an amorphous ratio described in below is less than 85%.

Hereinbelow, a method of verifying whether the alloy ribbon has a structure made of amorphous phases (a nano-hetero structure or a structure consisting of amorphous phases) or a structure made of crystal phases is described. In the present embodiment, the alloy ribbon having an amorphous ratio X shown by the below formula (1) of 85% or more is considered to have a structure made of amorphous phases; and the alloy ribbon having an amorphous ratio X of less than 85% is considered to have a structure made of crystal phases.

$$X = 100 - (Ic/(Ic+Ia) \times 100) \quad (1)$$

Ic: Crystal scattering integrated intensity
Ia: Amorphous scattering integrated intensity X-ray crystallography is performed to the alloy ribbon using XRD to identify the phases, and a peak of crystallized Fe or compound is read (Ic: Crystal scattering integrated intensity, Ia: Amorphous scattering integrated intensity). A crystallization ratio is determined from the intensity of the peak, then the amorphous ratio X is calculated from the above-mentioned formula (1). Hereinbelow, a method of calculation is described in further detail.

Figure 4:
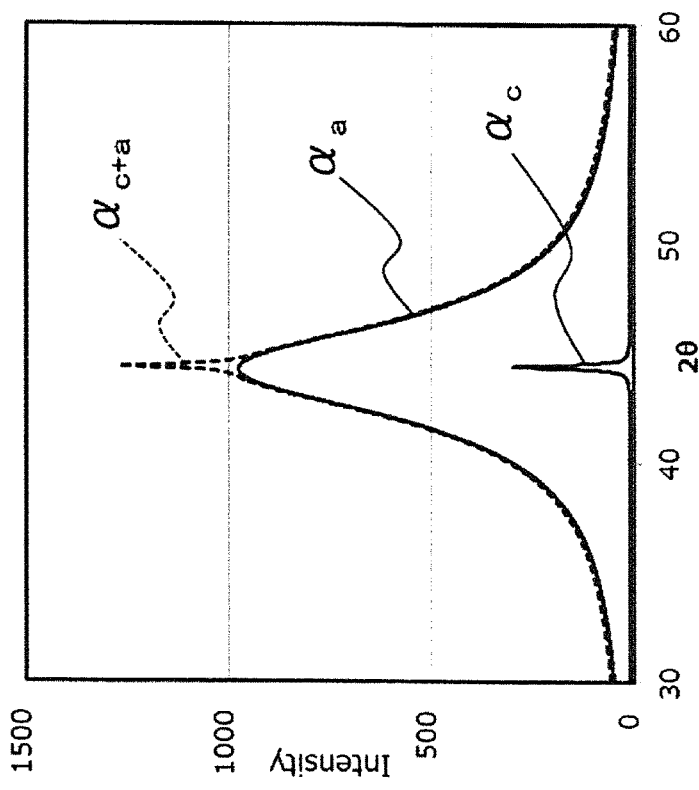
FIG. 4 is one example of pattern obtained by carrying out a profile fitting to the chart of FIG. 3.
Figure 3:
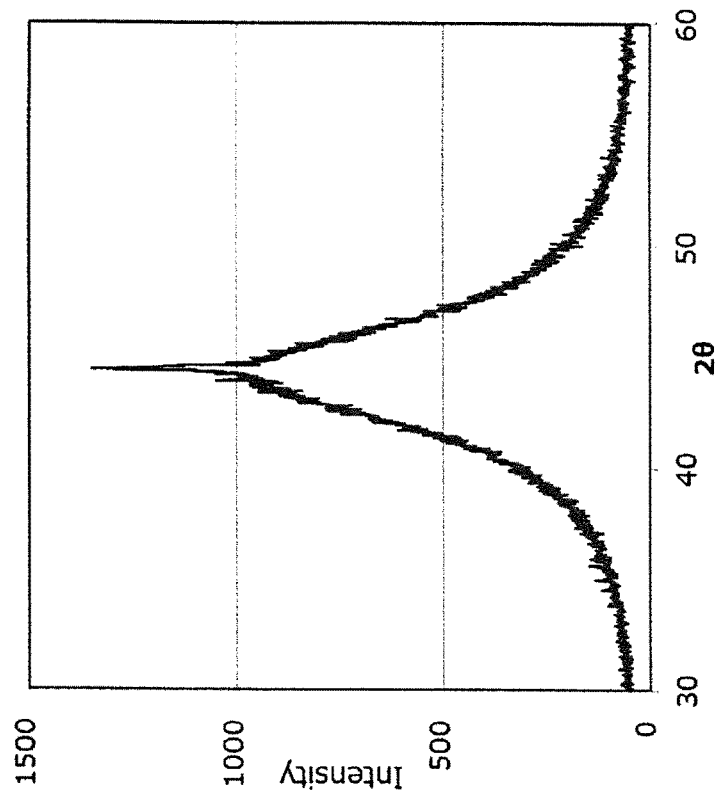
FIG. 3 is one example of chart obtained by X-ray crystallography.

X-ray crystallography is performed to the alloy ribbon using XRD to obtain a chart shown in FIG. 3. Then, using a Lorentzian function which is shown in the below formula (2), a profile fitting is performed to obtain a crystal component pattern $\alpha_c$ which shows a crystal scattering integrated intensity; an amorphous component pattern $\alpha_a$ which shows an amorphous scattering integrated intensity; and a combined pattern of these $\alpha_{c+a}$ which are shown in FIG. 4. From the obtained patterns of the crystal scattering integrated intensity and amorphous scattering integrated intensity, the amorphous ratio X is obtained from the above-mentioned formula (1). Note that, a measuring range is a range of a diffraction angle 2θ=30° to 60° in which a halo derived from an amorphous can be confirmed. Within this range, a margin of error between an integrated intensity which is actually measured by XRD and an integrated intensity which is calculated using Lorentzian function is to be within 1%.

[Formula 1]

$$f(x) = \frac{h}{1 + \frac{(x-u)^2}{w^2}} + b \quad (2)$$

h: Peak height
u: Peak position
w: Half bandwidth
b: Background height (Method of Producing Alloy Ribbon)

A method of producing the alloy ribbon according to the present embodiment is not particularly limited, and for example it can be produced by a single roll method. Also, the alloy ribbon may be a continuous alloy ribbon.

In a single roll method, first, pure metals of metal elements included in the alloy ribbon body obtained at the end are prepared, and weighed so to satisfy the same composition as the alloy ribbon body obtained at the end. Then, the pure metals of the metal elements are melted, and mixed to obtain a mother alloy. Note that, a method of melting the pure metals is not particularly limited, and for example a method of melting by a high frequency heat after vacuuming a chamber may be mentioned. Note that, the mother alloy and the alloy ribbon body obtained at the end usually have the same compositions.

Next, the produced mother alloy is heated and melted to obtain a molten metal. A temperature of the molten metal is not particularly limited, and for example it can be 1200 to 1500° C.

Figure 2:
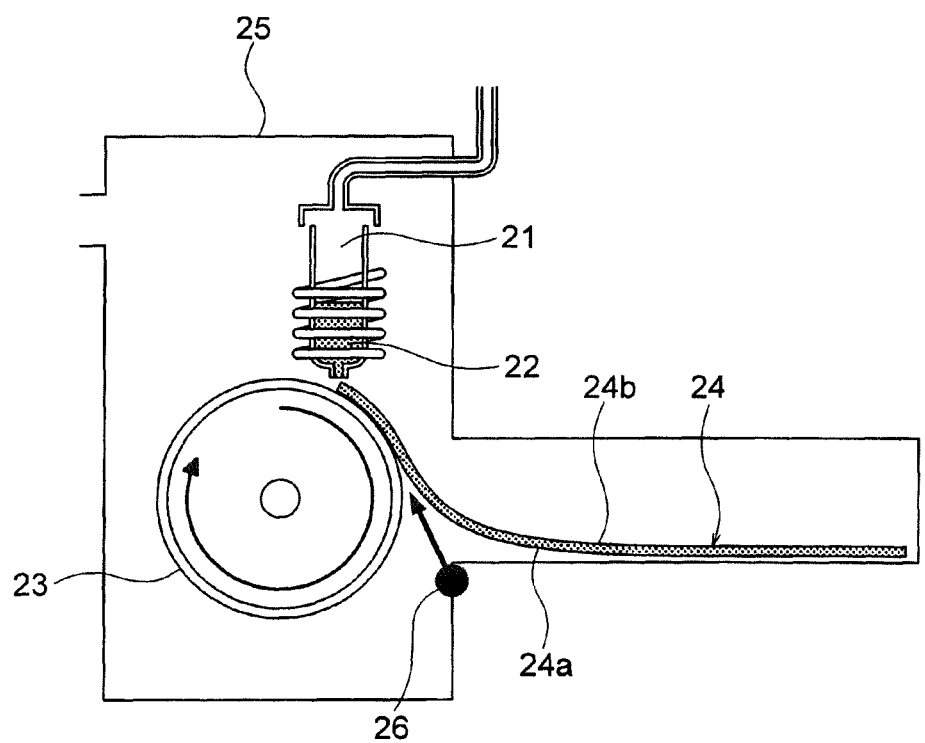
FIG. 2 is a schematic diagram of a single roll method.

FIG. 2 shows a schematic diagram of the machine which can be used for a single roll method in the present embodiment. At the inside of a chamber 25, a molten metal 22 is sprayed from a nozzle 21 to a roll 23 which is rotating in a direction indicated by an arrow, thereby an alloy ribbon 24 is produced in a rotating direction of the roll 23. Note that, a material of the roll 23 in the present embodiment is not particularly limited. For example, a roll made of Cu may be used.

A temperature of the roll 23 is preferably 5 to 30° C., and more preferably 10 to 20° C. Also, a difference between a pressure inside the chamber and a pressure in the spraying nozzle (spraying pressure) is preferably 20 to 80 kPa, and more preferably 30 to 80 kPa. By having the temperature of the roll 23 and the spraying pressure within the above-mentioned ranges, the surface roughness of the alloy ribbon can be controlled within a desired range.

Also, the alloy ribbon is released from the roll 23 due to the releasing gas sprayed from a releasing gas spraying machine 26. In the present embodiment, the releasing gas is preferably within a temperature range of 50 to 200° C., and more preferably 100 to 150° C. By controlling the temperature of the releasing gas within the above-mentioned range, the frequency of the scattered metals on the alloy ribbon can be controlled within a desired range. Note that, as the temperature of the releasing gas increases, the frequency of the scattered metals increases. Hence, the scattered metals are thought to be metals derived from the roll 23.

In a single roll method, the thickness of an obtained alloy ribbon 24 can be regulated mainly by adjusting a rotation speed of the roll 23. However, for example, the thickness of the obtained alloy ribbon 24 can be regulated also by adjusting a space between the nozzle 21 and the roll 23, a temperature of the molten metal, and so on. Further, in some cases even when the spraying pressure is small, the alloy ribbon 24 can be obtained by adjusting a space between the nozzle 21 and the roll 23, a temperature of the molten metal, and so on.

A vapor pressure inside the chamber 25 is not particularly limited. For example, the vapor pressure inside the chamber 25 may be 11 hPa or less by using Ar gas which has been adjusted with a dew point. Note that, there is no particular limit regarding the lower limit of the vapor pressure inside the chamber 25. The vapor pressure may be 1 hPa or less by filling Ar gas which has been adjusted with a dew point, or the vapor pressure may be 1 hPa or less by making a condition close to a vacuum state.

The obtained alloy ribbon includes the scattered metals. The scattered metals have predetermined diameters and include Cu, thereby the adhesiveness between the alloy ribbons is improved. Also, by stacking alloy ribbons at least one of which is made of the alloy ribbon, the magnetic core capable of suppressing the increase of the coercive force can be obtained. Therefore, a good magnetic core (particularly, a toroidal core) can be obtained.

Note that, by performing a heat treatment to the alloy ribbon 24, the alloy ribbon having a structure made of a Fe-based nanocrystal may be produced. The structure made of the Fe-based nanocrystal refers to a structure made of crystal phases having an amorphous ratio of less than 85%. The amorphous ratio can be measured by X-ray crystallography using XRD.

Conditions of the heat treatment are not particularly limited. Preferable heat treatment conditions differ depending on the composition of the alloy ribbon. Usually, a heat treatment temperature is preferably within a range of about 450 to 650° C., and a heat treatment time is preferably within a range of 0.5 to 10 hours. However, the preferable temperature and time may be outside of the above-mentioned ranges depending on the composition of the alloy ribbon. Also, an atmosphere during the heat treatment is not particularly limited. The heat treatment may be performed under active atmosphere such as in the air, or may be performed under inert atmosphere such as under Ar gas.

(Magnetic Component)

A magnetic component according to the present embodiment, particularly a magnetic core and an inductor, are obtained by using the alloy ribbon according to the present embodiment. Hereinbelow, a method of obtaining the magnetic core and the inductor according to the present embodiment is described, however it is not limited thereto. Also, as the use of the magnetic core, a transformer, a motor, and the like may be also mentioned besides an inductor.

As a method of obtaining the magnetic core by using the alloy ribbon according to the present embodiment, for example, a method of winding the alloy ribbon, a method of stacking alloy ribbons at least one of which is made of the alloy ribbon may be mentioned. By placing an insulator between the stacked alloy ribbons, the magnetic core with even more enhanced properties can be obtained.

Also, by providing a winding wire to the magnetic core, an inductance component can be obtained. A method of providing the winding wire and a method of producing the inductance component are not particularly limited. For example, a method of winding a wire for at least one turn to the magnetic core produced by the above-mentioned method may be mentioned.

Hereinabove, the embodiment of the present invention has been described, however the present invention is not limited thereto.

EXAMPLES

Hereinbelow, the present invention is described based on examples.

Raw material metals were weighed so to satisfy an alloy composition shown in Table 1, and melted by high frequency heating to obtain a mother alloy.

Then, the produced mother alloy was heated and melted, and a molten metal at a temperature of 1250° C. was formed. The metal was sprayed to a roll by a single roll method which rotates the roll at a rotation speed of 25 m/sec, thereby an alloy ribbon was made. Note that a material of the roll was Cu.

The roll was rotated in a direction shown in FIG. 2, at a roll temperature of 18° C. and a pressure difference (spraying pressure) between inside of a chamber and a spray nozzle of 50 kPa. A temperature range of a releasing gas was 80 to 180° C. Also, a slit width of a slit nozzle was 180 mm, a distance between a slit opening to the roll was 0.2 mm, a roll diameter φ was 300 mm, thereby the alloy ribbon having a thickness of 20 to 30 μm and a length of several tens meter was obtained.

Regarding the obtained alloy ribbon, as the temperature of the releasing gas increased, the frequency of scattered metals increased. Also, the obtained alloy ribbon was made of amorphous phases. An amorphous ratio X of each alloy ribbon was measured using XRD, and when X was 85% or more, it was considered that the alloy ribbon was made of amorphous phases. The obtained alloy ribbon was subjected to following evaluations. Results are shown in Table 1.

<Surface Roughness Ra>

Regarding the obtained alloy ribbon, a surface roughness (arithmetic average roughness) of a releasing surface was measured. The surface roughness of the releasing surface was measured using a stylus type surface roughness tester according to JIS-B0601. Three points were measured using the stylus type surface roughness tester and an average thereof was defined as the surface roughness Ra.

<Vickers Hardness>

A Vickers hardness (Hv) was determined by a micro-Vickers hardness test. A diamond pyramid indenter with a facing angle of 136° was pressed into the alloy ribbon, a size of indentation formed by pressing was measured, and a Vickers hardness was calculated. The indentation was observed using CCD camera. Five or more measurements were carried out, and an average thereof was defined as a Vickers hardness.

<Coercive Force>

A piece of alloy ribbon having a casting direction length of 310 mm was cut from the obtained alloy ribbon. Then, 120 pieces were punched out from the alloy ribbon being cut. Each of the 120 pieces had a toroidal shape of an outer diameter of 18 mm and an inner diameter of 10 mm. The pieces of alloy ribbon which were punched out were stacked and a wire was wound around, thereby a multilayer toroidal core having a height of about 3 mm was obtained. Note that, a heat treatment was not carried out in a magnetic field while the core was being produced.

The coercive force of the above-mentioned toroidal core was measured. The coercive force (Hc) at a magnetic flux density of 500 mT and a frequency of 10 kHz was measured using a B-H analyzer. Table 1 shows an increase rate of a coercive force in percentile (%) with respect to a coercive force of sample No. 1.

<EDS Measurement>

Metals including Cu scattered on the releasing surface of the alloy ribbon were detected using Energy Dispersive X-ray Spectroscopy (EDS). Among those metals on the releasing surface, metals with diameters of 1 μm or more were detected, and the frequency of the metals with diameters of 1 μm or more were calculated. Also, a composition of the detected metals was verified.

<Adhesiveness>

An adhesiveness of the alloy ribbon was evaluated using a tensile test. According to JIS K6850, a thickness of sample was set to a thickness of the alloy ribbon. An adhesiveness when two samples of the obtained alloy ribbons were stacked by applying pressure of 2 t/cm² at 500° C. for 30 seconds; and an adhesiveness when two samples of the obtained alloy ribbons were stacked by applying pressure of 2 t/cm² at 400° C. for 30 seconds were evaluated. The adhesiveness was evaluated as shown in below.

A: 3 N/cm² (30 kPa) or more
B: 1 N/cm² (10 kPa) or more and less than 3 N/cm² (30 kPa)
C: Less than 1 N/cm²

TABLE 1

| | | Alloy ribbon | | | | | | Stacked body | |
|---|---|---|---|---|---|---|---|---|---|
| No. | Composition | Hardness (Hv) | Thickness (μm) | Releasing surface Ra (μm) | Scattered metal composition | Scattered metal frequency (metals/mm²) | Coercive force increase rate | Adhesiveness (500° C.-2t/cm²) | Adhesiveness (400° C.-2t/cm²) |
| 1 | Fe75—Si15—B6—Nb3—Cu1(Amorphous) | 1100 | 25 | 0.6 | Cu | 5 | 0% | B | — |
| 2 | Fe75—Si15—B6—Nb3—Cu1(Amorphous) | 1100 | 25 | 1 | Cu | 67 | 0% | A | — |
| 3 | Fe75—Si15—B6—Nb3—Cu1(Amorphous) | 1100 | 25 | 1.2 | Cu | 300 | 1% | A | — |
| 4 | Fe75—Si15—B6—Nb3—Cu1(Amorphous) | 1100 | 25 | 0.4 | Cu | 0.6 | 0% | C | — |
| 5 | Fe75—Si15—B6—Nb3—Cu1(Amorphous) | 1100 | 25 | 0.5 | Cu | 0.9 | 0% | B | — |
| 6 | Fe75—Si15—B6—Nb3—Cu1(Amorphous) | 1100 | 25 | 0.5 | Cu | 26 | 1% | A | — |
| 7 | Fe75—Si15—B6—Nb3—Cu1(Amorphous) | 1100 | 25 | 0.8 | Cu | 500 | 1% | A | — |

TABLE 1-continued

| | | Alloy ribbon | | | | | | Stacked body | |
|---|---|---|---|---|---|---|---|---|---|
| No. | Composition | Hardness (Hv) | Thickness (μm) | Releasing surface Ra (μm) | Scattered metal composition | Scattered metal frequency (metals/mm$^2$) | Coercive force increase rate | Adhesiveness (500° C.-2t/cm$^2$) | Adhesiveness (400° C.-2t/cm$^2$) |
| 8 | Fe75—Si15—B6—Nb3—Cu1(Amorphous) | 1100 | 25 | 0.8 | Cu | 900 | 2% | A | — |
| 9 | Fe75—Si15—B6—Nb3—Cu1(Amorphous) | 1100 | 25 | 1 | Cu | 2700 | 4% | A | — |
| 10 | Fe75—Si15—B6—Nb3—Cu1(Amorphous) | 1100 | 25 | 1 | Cu | 4400 | 8% | A | — |
| 11 | Fe75—Si15—B6—Nb3—Cu1(Amorphous) | 1100 | 25 | 1 | Cu | 4600 | 10% | A | — |
| 12 | Fe75—Si15—B6—Nb3—Cu1(Amorphous) | 1100 | 25 | 0.6 | CuZr | 21 | 1% | A | — |
| 13 | Fe75—Si15—B6—Nb3—Cu1(Amorphous) | 1100 | 25 | 0.6 | CuZrCr | 14 | 1% | A | — |
| 14 | Fe75—Si15—B6—Nb3—Cu1(Amorphous) | 1100 | 25 | 0.6 | BeCu | 9 | 1% | B | — |
| 15 | Co70—Fe5—Si15—B10(Amorphous) | 900 | 25 | 0.6 | Cu | 0.5 | 0% | — | C |
| 16 | Co70—Fe5—Si15—B10(Amorphous) | 900 | 25 | 0.6 | Cu | 8 | 0% | — | B |
| 17 | Co70—Fe5—Si15—B10(Amorphous) | 900 | 25 | 0.6 | Cu | 120 | 1% | — | A |
| 18 | Co70—Fe5—Si15—B10(Amorphous) | 900 | 25 | 0.6 | Cu | 800 | 2% | — | A |
| 19 | Co70—Fe5—Si15—B10(Amorphous) | 900 | 25 | 0.6 | CuZr | 21 | 0% | — | A |
| 20 | Co70—Fe5—Si15—B10(Amorphous) | 900 | 25 | 0.6 | CuZrCr | 17 | 1% | — | A |
| 21 | Co70—Fe5—Si15—B10(Amorphous) | 900 | 25 | 0.6 | BeCu | 7 | 0% | — | B |

According to Table 1, it was confirmed that when the alloy ribbon had the scattered metals and the diameters of the scattered metals were 1 μm or more; and further when the scattered metals included Cu; then the stacked body had excellent adhesiveness, and the alloy ribbon had a good coercive force. Particularly, when the frequency of scattered metals was 10 to 1,000 metal/mm$^2$, then the alloy ribbon having excellent adhesiveness and coercive force were obtained.

NUMERICAL REFERENCES

21 . . . Nozzle
22 . . . Molten metal
23 . . . Roll
24 . . . (Alloy) ribbon
24a . . . Releasing surface
24b . . . Free surface
25 . . . Chamber
26 . . . Releasing gas spraying machine
41 . . . Edge part
43 . . . Center part

What is claimed is:

1. An alloy ribbon having scattered metals disposed on at least one surface of the alloy ribbon in a density of 1 to 4,500 scattered metals/mm$^2$,
   wherein diameters of the scattered metals are 1 μm or more,
   the scattered metals include Cu, and
   the surface having the scattered metals has a surface roughness Ra of 1.0 μm or less.

2. The alloy ribbon according to claim 1, wherein the alloy ribbon has a Vickers hardness of 900 Hv or more.

3. The alloy ribbon according to claim 1, wherein the scattered metals including Cu further include at least one selected from Zr, Cr, and Be.

4. The alloy ribbon according to claim 1 comprising the scattered metals in a density of 10 to 1,000 scattered metals/mm$^2$.

5. A magnetic core formed by stacking alloy ribbons at least one of which is comprised of the alloy ribbon according to claim 1.

* * * * *